Patented May 17, 1927.

1,629,393

UNITED STATES PATENT OFFICE.

HERMAN B. KIPPER, OF MUSKEGON, MICHIGAN.

COMPOSITION FOR USE IN MAKING SULPHATE OR KRAFT PULP AND PROCESS OF MAKING SAME.

No Drawing. Application filed November 26, 1924. Serial No. 752,465.

This invention relates to materials for use in the manufacture of paper, and more particularly sulphate or kraft pulp, and to processes of producing such materials.

In the manufacture of sulphate or kraft pulp, a solution containing principally sodium hydroxide and sodium sulphide is used to digest the wood to pulp. Sodium sulphate, or salt cake is the chemical marketed for these operations and this is reduced by the pulp manufacturer to sodium sulphide. The sodium sulphide largely loses its sulphur during the digestion process with the formation of sodium carbonate which is returned from the digestion as "spent or black liquor", the latter being evaporated, and the sodium carbonate thus obtained being converted into sodium hydroxide by means of lime. Attempts have been made to use nitre cake or sodium acid or hydrogen sulphate for reduction to sodium sulphide. But because of the free sulphuric acid in this compound its use has been restricted, since this free acid corrodes certain parts of the furnace and evaporation apparatus.

One of the objects of the present invention is to make it possible to use nitre cake without danger of corrosion of the apparatus.

Other and further advantages and objects of this invention will appear from the more detailed description set forth below, it being understood that various changes may be made herein by those skilled in the art, without departing from the scope and spirit of this invention.

Fundamentally, this invention comprises the neutralization of the free acid in the niter cake so that the latter is rendered available for use in the sulphate or kraft process. This neutralization may be effected in a number of different ways. In one case, sodium carbonate may be added to the niter cake in such proportion as to neutralize the free sulphuric acid present, and the two substances thoroughly are ground and mixed together so that they may be fed to the reduction furnaces without fear of injury to the latter or to the evaporation apparatus.

Instead of sodium carbonate, there may be used what is known as "fished salts" which is a by-product secured from commercial processes of making caustic soda. These "fished salts" may be added to the ground nitre cake and the mixture may be heated during the mixing and grinding operation. There is thus obtained a practically neutral salt cake, or sodium sulphate for use in the reduction furnaces.

Furthermore, the nitre cake may be mixed with either the sodium carbonate in desired proportion, or with the "fished salts" as the case may be, and the mixture may be dissolved directly in the "black liquor" before the latter enters the "disc" or other evaporators.

While there has been set forth above the use of sodium carbonate or of "fished salts" in neutralizing the free acid of the nitre cake, it is obvious that the free acid in the nitre cake may be neutralized by a mixture of sodium carbonate with "fished salts" in any desired proportion of these ingredients, the proportion of the mixture in the preferred case being that required to form with the acid sulphate, sodium sulphate.

The processes set forth above afford a very desirable and inexpensive method of using nitre cake in making sulphate or kraft pulp.

As will be understood by those skilled in the art, the term "spent or black liquor" from the kraft process is meant the aqueous solution of various soluble salts such as sodium carbonate, and the insoluble ingredients mixed with said solution and secured from the digestion of the pulp.

The organic matter contained in such "black liquor" is burned in the recovery process and the sodium salts, more especially the sodium carbonate, are causticized to yield sodium hydrate and are neutralized in the pulp digestion.

It will also be understood by those skilled in the art that by the term "fished salts" is meant the waste or by-products obtained from the manufacture of caustic soda. These salts consist principally of sodium hydrate, sodium carbonate, and sodium sulphate.

Having thus set forth my invention, I claim:—

1. A composition for making kraft pulp comprising sodium hydrogen sulphate and "fished salts."

2. A composition for use in kraft pulp manufacture comprising sodium hydrogen sulphate and "fished salts" in such proportions as to produce sodium sulphate.

3. A composition for use in kraft pulp manufacture comprising sodium hydrogen sulphate, "fished salts" and "black liquor."

4. A composition for use in making kraft pulp comprising nitre cake, sodium carbonate, and "fished salts."

5. A process of making a composition for use in kraft pulp manufacture which comprises mixing sodium hydrogen sulphate and "fished salts" and reducing the mixture.

6. A process of making a composition for use in kraft pulp manufacture which comprises mixing and grinding together sodium hydrogen sulphate and sodium carbonate in such proportions as to yield sodium sulphate and reducing the mixture.

7. A process of making a composition for use in sulphate pulp manufacture which comprises mixing sodium hydrogen sulphate and sodium carbonate with "black liquor" and evaporating the mixture.

8. A process of making a composition for use in kraft pulp manufacture which comprises mixing sodium hydrogen sulphate and "fished salts" in such proportions as to yield sodium sulphate, with "black liquor" and evaporating the mixture.

In testimony whereof I have hereunto set my hand.

HERMAN B. KIPPER.